US009219859B2

(12) United States Patent
Hwang et al.

(10) Patent No.: US 9,219,859 B2
(45) Date of Patent: Dec. 22, 2015

(54) CAMERA ASSEMBLY HAVING A WIDE VIEWING ANGLE AND IMAGE ACQUISITION METHOD USING THE SAME

(71) Applicant: SAMSUNG ELECTRONICS CO., LTD., Suwon-si (KR)

(72) Inventors: Hyo Seok Hwang, Seoul (KR); Kyung Shik Roh, Seongnam (KR); Suk June Yoon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 64 days.

(21) Appl. No.: 14/020,107

(22) Filed: Sep. 6, 2013

(65) Prior Publication Data

US 2014/0313359 A1    Oct. 23, 2014

(30) Foreign Application Priority Data

Apr. 23, 2013    (KR) .................. 10-2013-0044673

(51) Int. Cl.
*H04N 5/225*        (2006.01)
*H04N 5/232*        (2006.01)

(52) U.S. Cl.
CPC ................. *H04N 5/23238* (2013.01)

(58) Field of Classification Search
CPC .......... H04N 13/0443; H04N 5/23238; H04N 2013/0088; H04N 2005/2255; H04N 7/183
USPC ................... 348/333.08, 65–76; 359/839
See application file for complete search history.

(56) References Cited

U.S. PATENT DOCUMENTS

2003/0214734 A1* 11/2003 Nishioka et al. ............ 359/846
2005/0002097 A1*  1/2005 Boyd et al. .................. 359/487
2011/0105847 A1*  5/2011 Dayton ........................ 600/165
2013/0002925 A1*  1/2013 Lin ......................... 348/333.08

FOREIGN PATENT DOCUMENTS

JP    2004-522983      7/2004
KR    10-2001-0107689  12/2001
KR    10-2011-0069614   6/2011

OTHER PUBLICATIONS

Wang, et al. "Development of a Catadioptric Endoscope Objective with Forward and Side Views." Journal of Biomedical Optics, 16(6), Jun. 2011.*

* cited by examiner

*Primary Examiner* — Twyler Haskins
*Assistant Examiner* — Dwight C Tejano
(74) *Attorney, Agent, or Firm* — Harness, Dickey & Pierce

(57) ABSTRACT

Disclosed is a camera assembly having a wide viewing angle using a variable mirror. The camera assembly includes a variable mirror located in front of an image sensor, a variable mirror controller to switch a mode of the variable mirror to one of a reflection mode to reflect light incident upon the variable mirror and a transmission mode to transmit light incident upon the variable mirror, an image sensor to sense the light reflected by the variable mirror to acquire first image data and to sense the light transmitted through the variable mirror to acquire second image data, and an image processing unit to register the first image data and the second image data acquired by the image sensor to generate a third image.

20 Claims, 9 Drawing Sheets

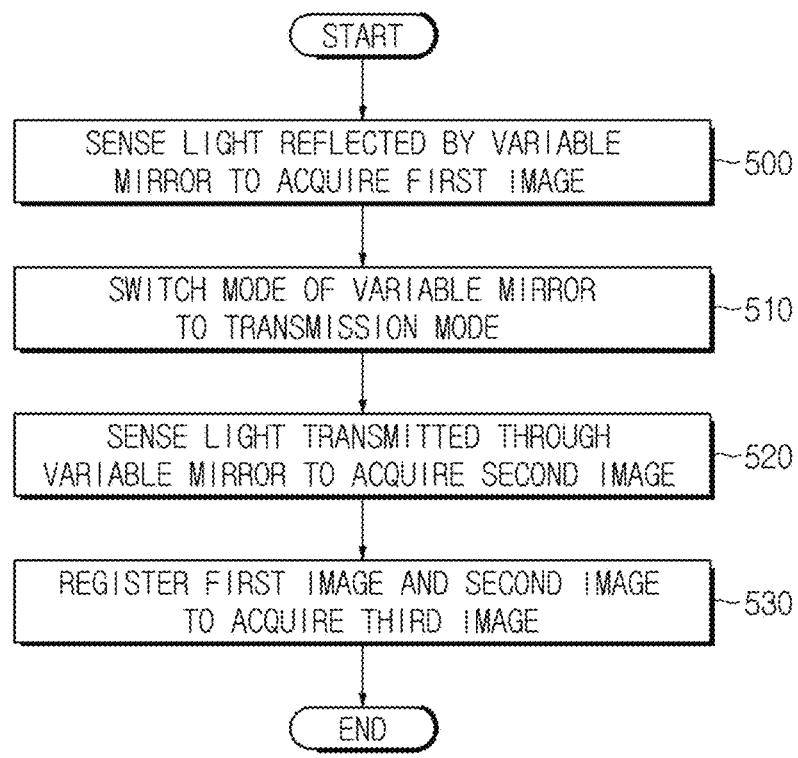

CAMERA ASSEMBLY HAVING A WIDE VIEWING ANGLE AND IMAGE ACQUISITION METHOD USING THE SAME

CROSS-REFERENCE TO RELATED APPLICATIONS

This application claims the benefit of Korean Patent Application No. 2013-0044673, filed on Apr. 23, 2013 in the Korean Intellectual Property Office, the disclosure of which is incorporated herein by reference.

BACKGROUND

1. Field

One or more embodiments of the present disclosure relate to a camera assembly to acquire an image having a wide viewing angle.

2. Description of the Related Art

A method of physically arranging a plurality of cameras may be used to acquire an image having a wide viewing angle. This method may require a large space and registration of acquired images. In this method, however, configuration may be easy and image distortion may be low.

Alternatively, a wide-angle lens may be used to acquire an image having a wide viewing angle. That is, a wide-angle lens or a fisheye lens may be used to acquire a wide viewing angle. Such a lens generally has a focal distance less than about 50 mm, which is a focal length used in a camera for most general-purpose photography. Thus, the wide-angle lens has a wider viewing angle than a standard lens. For example, ae wide-angle lens typically has a viewing angle of about 120 degrees. A fisheye lens typically has a viewing angle of about 180 degrees, which is greater than that of the wide-angle lens. An image acquired by the fisheye lens, however, may be distorted.

It may be necessary for a camera to satisfy several conditions such that the camera is used in an endoscope, such as a laparoscope used in a small area like the abdominal cavity during surgical operation. First, it may be necessary for the size of the camera to be small. The camera may be inserted into an orifice of the human body or through an incision during a surgical operation. When the size of the camera is large, the incision must be enlarged or a space desired for the surgical operation may be reduced. For this reason, one camera or a minimum number of cameras may be used instead of an arrangement of a plurality of cameras. Second, it may be necessary for the camera to have a wide viewing angle. The camera may monitor motion of surgical tools near the camera and an environment of a surgical region in addition to observing the front of the surgical region. A front visual field may be provided through a high-quality image without distortion as if a human were directly viewing an object with the naked eye.

Consequently, it may be necessary to develop a camera having a small size and a wide viewing angle which is suited to a laparoscope or a surgical robot.

SUMMARY

It is an aspect of the present disclosure to provide a camera assembly having a wide viewing angle using a variable mirror.

Additional aspects of the disclosure will be set forth in part in the description which follows and, in part, will be obvious from the description, or may be learned by practice of the disclosure.

In accordance with one aspect of the present disclosure, a camera assembly includes a variable mirror located in front of an image sensor, a variable mirror controller to switch a mode of the variable mirror to one of a reflection mode to reflect light incident upon the variable mirror and a transmission mode to transmit light incident upon the variable mirror, an image sensor to sense the light reflected by the variable mirror to acquire first image data and to sense the light transmitted through the variable mirror to acquire second image data, and an image processing unit to register the first image data and the second image data acquired by the image sensor to generate a third image.

The variable mirror may be configured such that a surface of the variable mirror opposite the image sensor is concave and the camera assembly may further include a reflection unit to reflect incident light to the concave surface of the variable mirror.

The image sensor may sense light reflected by the reflection unit and re-reflected by the variable mirror to acquire the first image data and the image processing unit may generate a first image from the first image data.

In accordance with another aspect of the present disclosure, an image acquisition method using a camera assembly includes sensing light reflected by a variable mirror of the camera assembly to acquire a first image, switching a mode of the variable mirror to a transmission mode, sensing light transmitted through the variable mirror to acquire a second image, and registering the first image and the second image to acquire a third image.

In accordance with another aspect of the present disclosure a camera may include a variable mirror configured to selectively transmit light in a light transmission mode and to reflect light in a light reflection mode, and a controller to control the variable mirror to switch between the light transmission mode and the light reflection mode.

In accordance with another aspect of the present disclosure an image acquisition method may include controlling a variable mirror to selectively transmit light in a light transmission mode and to reflect light in a light reflection mode, acquiring first image data by sensing the light reflected by the variable mirror, and acquiring second image data by sensing the light transmitted through the variable mirror.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a flowchart showing an image acquisition method using the camera assembly.

DETAILED DESCRIPTION

Figure 1:
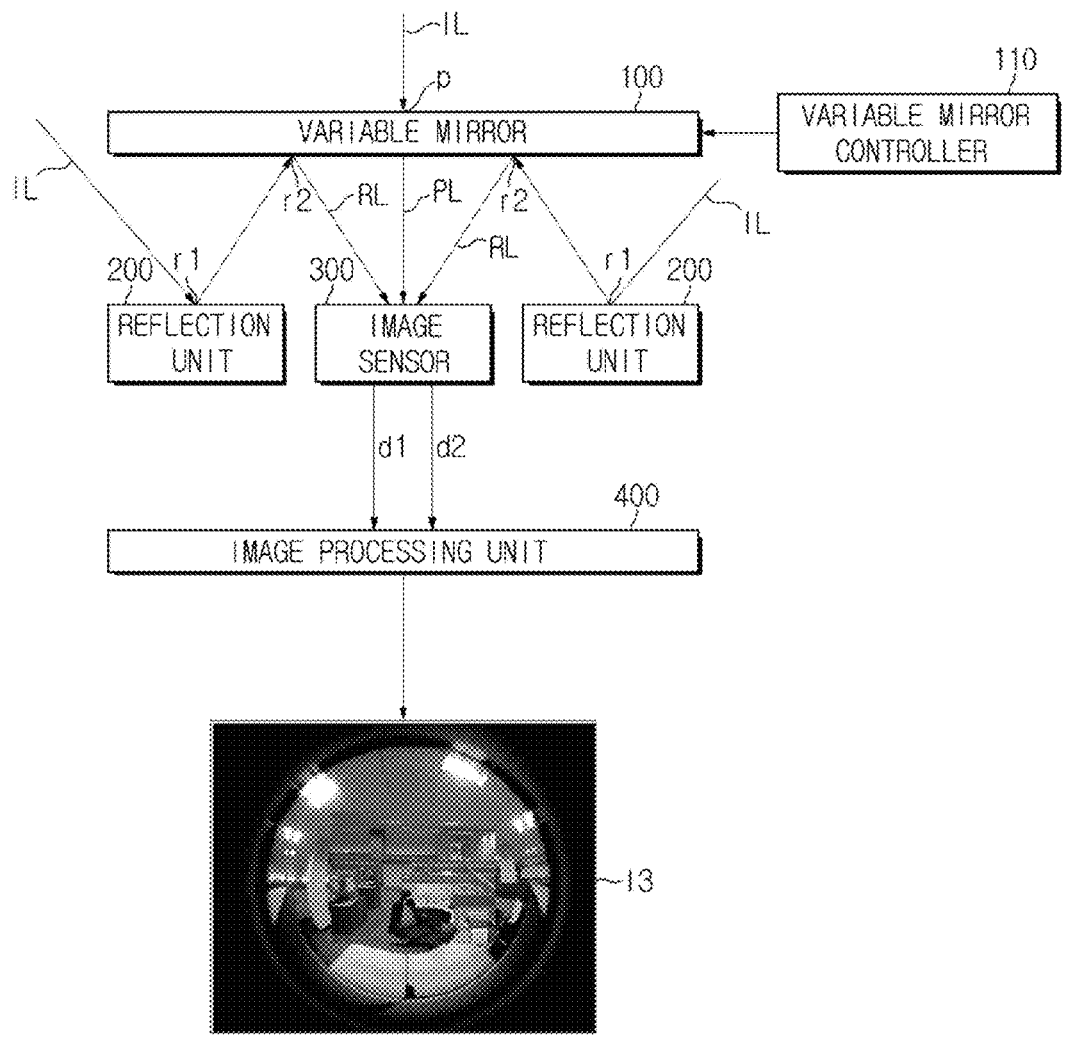
FIG. 1 is a block diagram showing the configuration of a camera assembly.

Reference will now be made in detail to the embodiments of the present disclosure, examples of which are illustrated in the accompanying drawings, wherein like reference numerals refer to like elements throughout.

Figure 2:
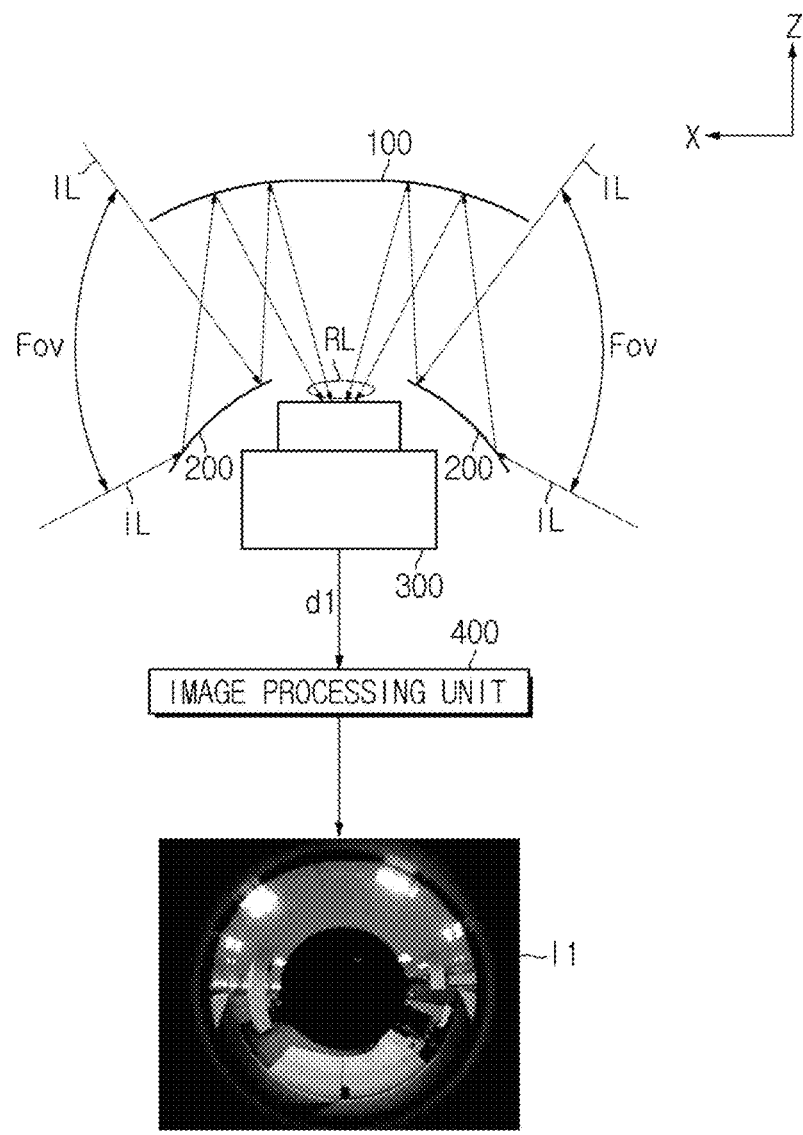
FIG. 2 is a view showing an image acquisition process in a case in which a variable mirror of the camera assembly is in a reflection mode.
Figure 3:
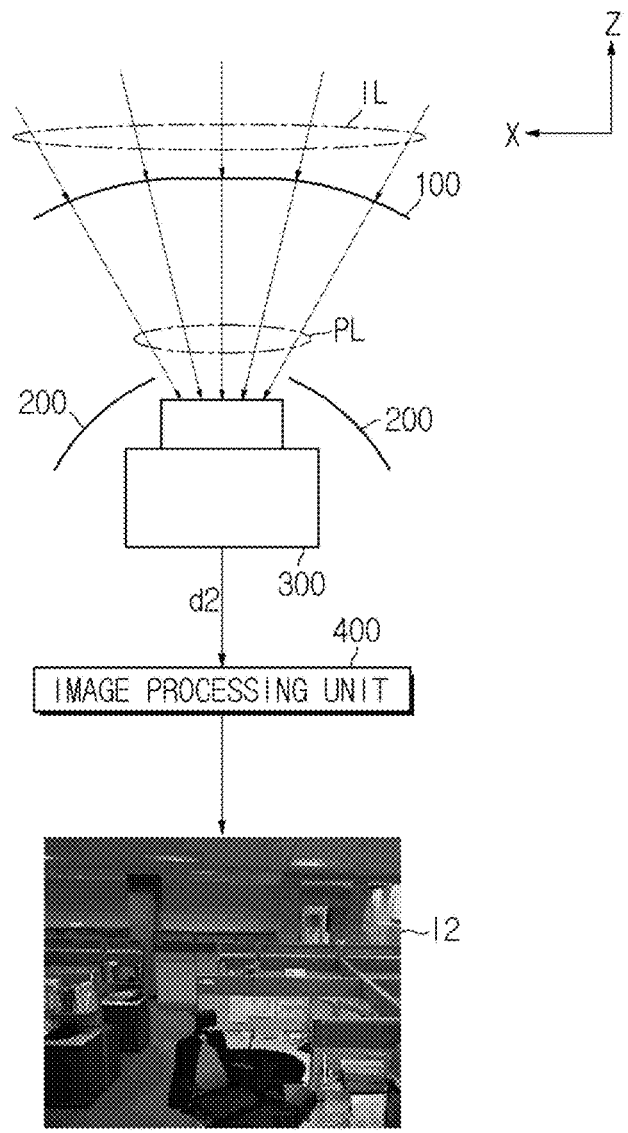
FIG. 3 is a view showing an image acquisition process in a case in which the variable mirror of the camera assembly is in a transmission mode.
Figure 4:
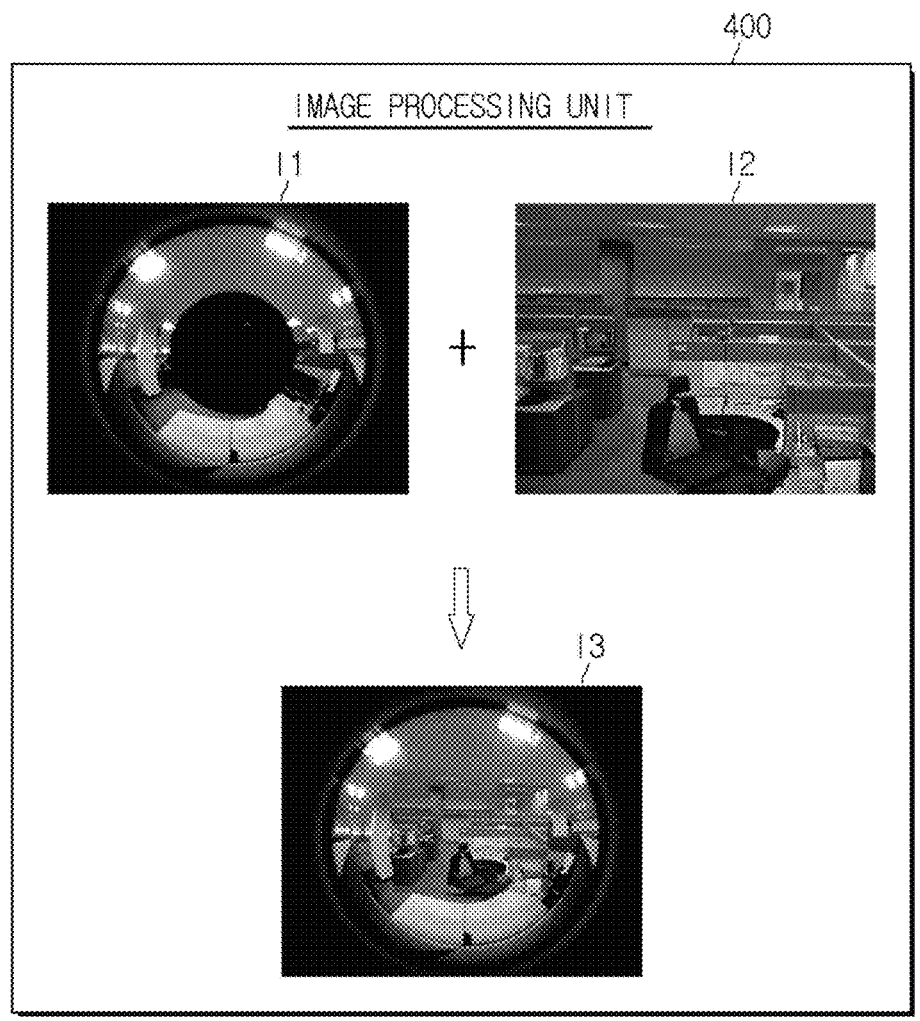
FIG. 4 is a view showing image registration performed by an image processing unit.
Figure 5:
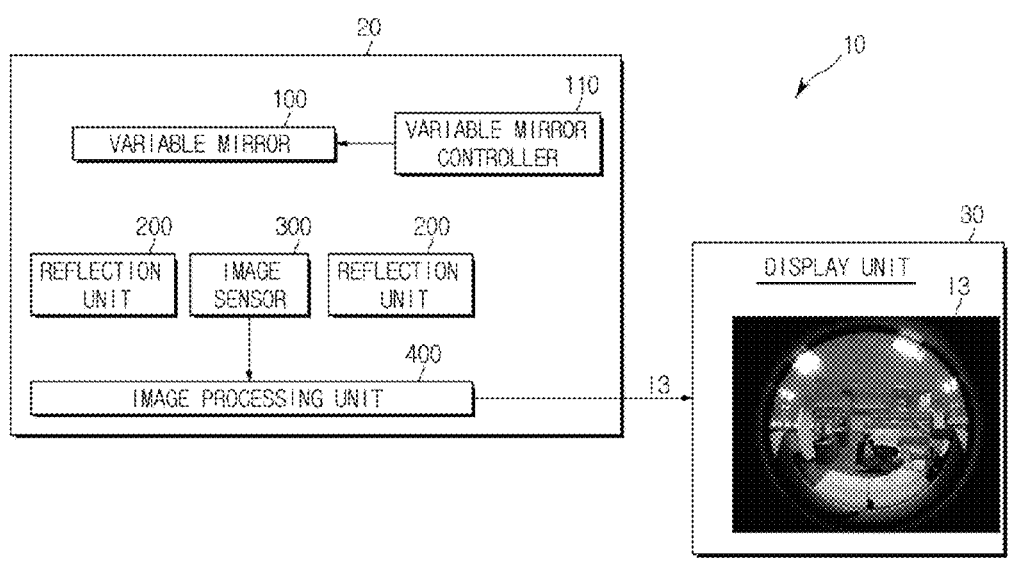
FIG. 5 is a block diagram showing an apparatus including the camera assembly of FIG. 1.

FIG. 1 is a block diagram showing the configuration of a camera assembly 20, FIG. 2 is a view showing an image acquisition process in a case in which a variable mirror 100 of the camera assembly 20 is in a reflection mode, and FIG. 3 is a view showing an image acquisition process in a case in which the variable mirror 100 of the camera assembly 20 is in a transmission mode. FIG. 4 is a view showing image registration performed by an image processing unit 400 and FIG. 5 is a block diagram showing an apparatus including the camera assembly 20 of FIG. 1.

Referring to FIG. 1, the camera assembly 20 may include, for example, a variable mirror 100, a variable mirror controller 110, a reflection unit 200, an image sensor 300, and an image processing unit 400.

The variable mirror 100 may be located in front of the image sensor 300. Light IL is transmitted (p) through the variable mirror 100 or is reflected by the variable mirror 100 and is then incident upon the image sensor 300.

The variable mirror controller 110 applies power to the variable mirror 100 to switch between various modes of the variable mirror 100.

The mode of the variable mirror 100 may be switched between a transmission mode in which light IL incident upon the variable mirror 100 is transmitted through the variable mirror 100 and a reflection mode in which light IL incident upon the variable mirror 100 is reflected by the variable mirror 100. In the transmission mode, the variable mirror 100 functions as a translucent or transparent object such as glass or a window. In the reflection mode, the variable mirror 100 functions as a reflective object such as a mirror.

The variable mirror controller 110 applies power to the variable mirror 100 to switch the mode of the variable mirror 100 from the reflection mode to the transmission mode or from the transmission mode to the reflection mode. In an embodiment, the variable mirror controller 110 applies a predetermined magnitude of power to the variable mirror 100 to switch the mode of the variable mirror 100 from the reflection mode to the transmission mode or from the transmission mode to the reflection mode.

As shown in FIGS. 1 to 4, a surface of the variable mirror 100 opposite the image sensor 300 may be concave.

When the image sensor 300 acquires first image data d1 in the reflection mode of the variable mirror 100, the variable mirror controller 110 switches the mode of the variable mirror 100 to the transmission mode. When the image sensor 300 acquires second image data d2 in the transmission mode of the variable mirror 100, the variable mirror controller 110 switches the mode of the variable mirror 100 to the reflection mode. During operation of the camera assembly 20, mode switching of the variable mirror 100 may be repeatedly performed.

As shown in FIGS. 1, 2 and 3, the reflection unit 200 may be provided at the lower side of the variable mirror 100. A surface of the reflection unit 200 opposite the concave surface of the variable mirror 100 may be convex.

A central part of the reflection unit 200 may be opposite the image sensor 300. Consequently, the central part of the reflection unit 200 corresponding to the image sensor 300 may be formed of a material transmitting light or may have an opening as shown in FIGS. 2 and 3 so as not to disturb light sensing of the image sensor 300.

The reflection unit 200 may be formed of a mirror to reflect (r1) light incident upon the reflection unit 200. In addition, curvature of the reflection unit 200 is set to reflect (r1) light incident in a lateral direction or a peripheral direction toward the concave surface of the variable mirror 100.

The variable mirror 100 and the reflection unit 200 may be integrated into a single module, which may be detachably mounted in a camera including the image sensor 300.

The image sensor 300 may be realized by a charge coupled device (CCD) or a complementary metal oxide semiconductor (CMOS).

In a state in which the variable mirror 100 is in the reflection mode, as shown in FIG. 2, light incident in the lateral direction of the image sensor 300 is reflected (r1) by the reflection unit 200 and advances toward the concave surface of the variable mirror 100.

The concave surface of the variable mirror 100 reflects (r2) the light reflected by the reflection unit 200 toward the image sensor 300.

The image sensor 300 senses light RL reflected by the variable mirror 100 to generate first image data d1. The first image data d1 generated by the image sensor 300 is output to the image processing unit 400. The image processing unit 400 calculates a first image I1 from the first image data d1.

The first image I1 is shown in FIG. 2. The first image I1 is calculated by sensing light incident in the lateral direction of the image sensor 300. Consequently, the first image I1 is an image of the lateral direction, excluding the central part of the image sensor 300.

In a case in which the camera assembly 20 has a structure as shown in FIG. 2, the camera assembly 20 has a viewing angle as shown in item I1 of FIG. 2 with respect to light incident in the lateral direction.

When the image sensor 300 outputs the first image data d1 to the image processing unit 400, the variable mirror controller 110 switches the mode of the variable mirror 100 from the reflection mode to the transmission mode.

FIG. 3 shows a process of acquiring a second image I2 after the mode of the variable mirror 100 is switched to the transmission mode. When the variable mirror 100 is in the transmission mode, light incident in a front direction, i.e. a z-axis direction, of the image sensor 300 is transmitted (p) through the variable mirror 100 and is condensed upon the image sensor 300.

The image sensor 300 senses light PL transmitted through the variable mirror 100 to generate second image data d2. The second image data d2 generated by the image sensor 300 is output to the image processing unit 400. The image processing unit 400 calculates a second image I2 from the second image data d2.

The second image I2 is shown in FIG. 3. The second image I2 is calculated by sensing light incident in the front direction of the image sensor 300. Consequently, the second image I2 is an image taken in the front direction of the image sensor 300.

As shown in FIG. 4, the image processing unit 400 receives the first image data d1 and the second image data d2 from the image sensor 300, calculates the first image I1 and the second image I2, and registers the first image I1 and the second image I2 to calculate a third image I3.

The first image I1 includes information regarding the lateral direction of the image sensor 300 but does not include information regarding the front direction of the image sensor 300. On the other hand, the second image I2 includes information regarding the front direction of the image sensor 300 but does not include information regarding the lateral direction of the image sensor 300.

The image processing unit 400 registers the first image I1 and the second image I2 to calculate the third image I3 including both information regarding the front direction of the image sensor 300 as well as information regarding the lateral direction of the image sensor 300.

In this embodiment, the camera assembly 20 has a wider viewing angle than a conventional wide-angle lens or a fisheye lens. Consequently, the image acquired by the camera assembly 20 according to this embodiment will generally include much more information than a conventionally obtained image.

FIG. 5 shows the configuration of an apparatus including the camera assembly 20 shown in FIGS. 1 to 4.

The apparatus shown in FIG. 5 includes the camera assembly 20 and a display unit 30.

The description of the camera assembly 20 is replaced by the above description given with reference to FIGS. 1 to 4. Although the camera assembly 20 shown in FIGS. 1 to 4 is shown as an example in FIG. 5, a camera assembly 20 shown in FIGS. 6 to 8, which will hereinafter be described, may alternatively be included in the camera assembly 20 of FIG. 5.

The display unit 30 receives data necessary to display the third image I3 output from the image processing unit 400 of the camera assembly 20 to display the third image I3.

An example of the apparatus including the camera assembly 20 may be an endoscope, such as a laparoscope. The camera assembly 20 according to this embodiment is suited to an apparatus, such as a laparoscope, which acquires an image having a wide viewing angle using a small-sized camera.

However, examples of the apparatus including the camera assembly 20 are not limited thereto. An apparatus including a display unit 30 to display a third image I3 output from a camera assembly 20 is included in apparatuses according to embodiments of the present disclosure. Apparatuses, such as a smartphone, television, security camera, monitoring camera, robot, and vehicle, including the camera assembly 20 and display unit 30 according to this embodiment may be included in the apparatuses according to embodiments of the present disclosure.

Figure 6:
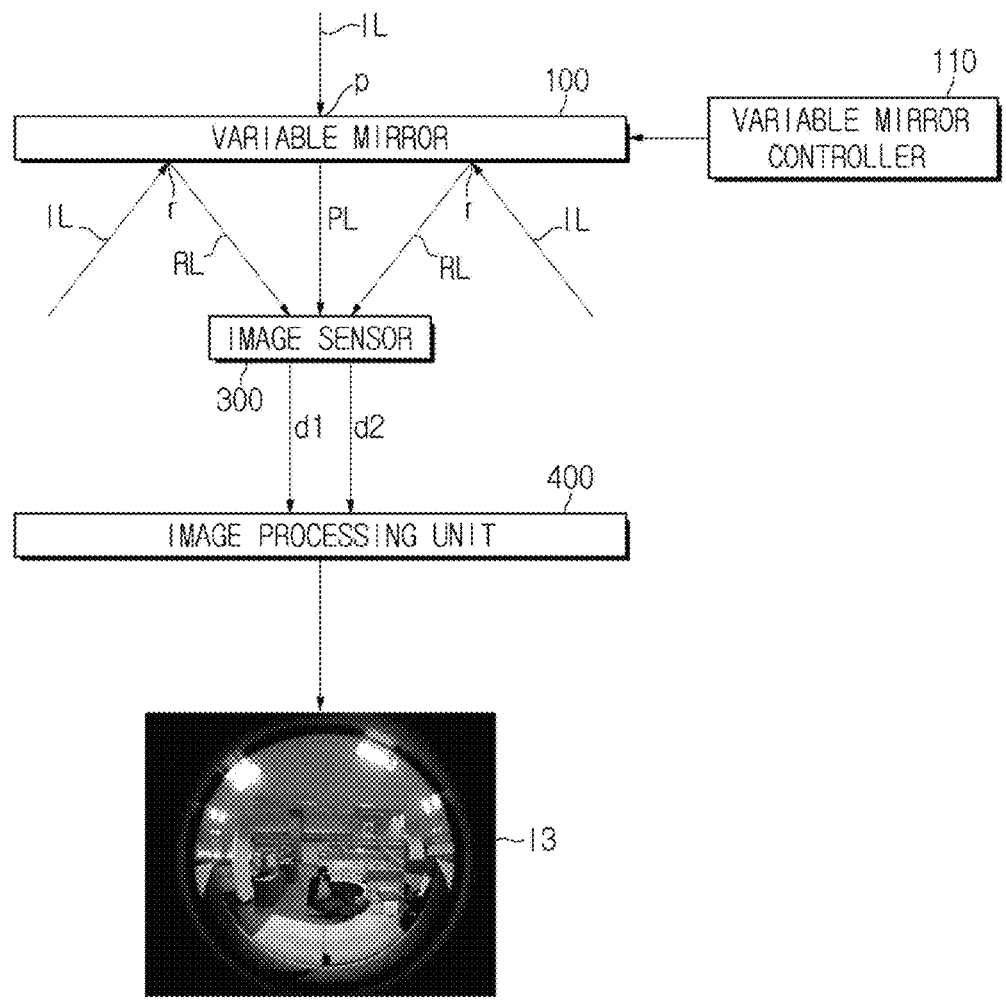
FIG. 6 is a block diagram showing the configuration of a camera assembly according to another embodiment.
Figure 7:
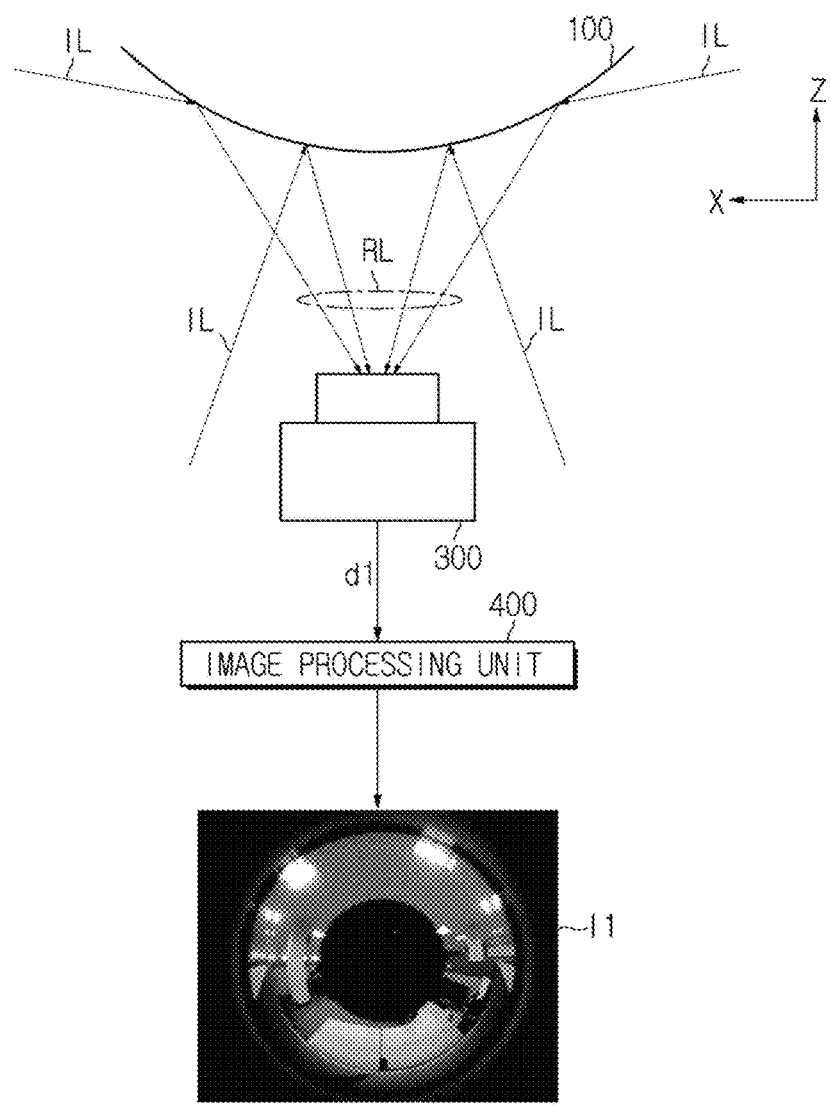
FIG. 7 is a view showing an image acquisition process in a case in which a variable mirror of the camera assembly is in a reflection mode.
Figure 8:
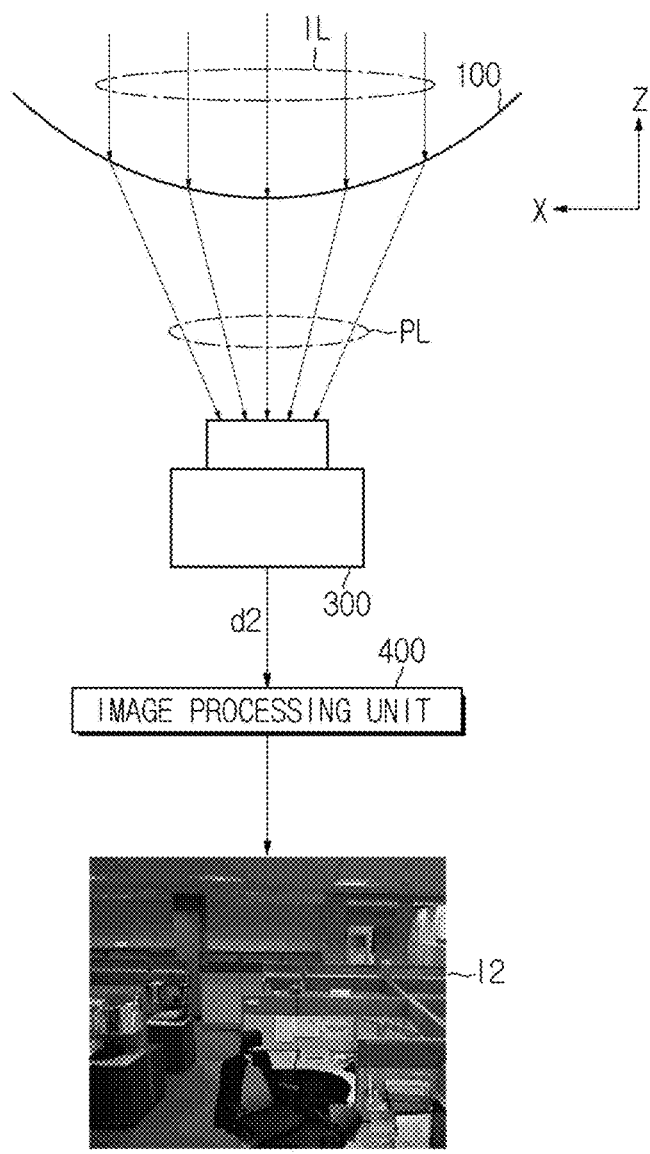
FIG. 8 is a view showing an image acquisition process in a case in which the variable mirror of the camera assembly is in a transmission mode.

FIG. 6 is a block diagram showing the configuration of a camera assembly 20 according to another embodiment, FIG. 7 is a view showing an image acquisition process in a case in which a variable mirror 100 of the camera assembly 20 is in a reflection mode, and FIG. 8 is a view showing an image acquisition process in a case in which the variable mirror 100 of the camera assembly 20 is in a transmission mode.

Referring to FIG. 6, the camera assembly 20 may include, for example, a variable mirror 100, a variable mirror controller 110, an image sensor 300, and an image processing unit 400.

The variable mirror 100 may be located in front of the image sensor 300. Light may be transmitted through the variable mirror 100 or reflected (r) by the variable mirror 100 and is then incident upon the image sensor 300.

The variable mirror controller 110 applies power to the variable mirror 100 to switch a mode of the variable mirror 100.

The mode of the variable mirror 100 may be switched between a transmission mode in which light incident upon the variable mirror 100 is transmitted through the variable mirror 100 and a reflection mode in which light incident upon the variable mirror 100 is reflected by the variable mirror 100. In the transmission mode, the variable mirror 100 functions as a translucent or transparent object such as glass or a window. In the reflection mode, the variable mirror 100 functions as a reflective object such as a mirror.

The variable mirror controller 110 applies power to the variable mirror 100 to switch the mode of the variable mirror 100 from the reflection mode to the transmission mode or from the transmission mode to the reflection mode.

As shown in FIGS. 6 to 8, a surface of the variable mirror 100 opposite the image sensor 300 may be convex.

When the image sensor 300 acquires first image data d1 in the reflection mode of the variable mirror 100, the variable mirror controller 110 switches the mode of the variable mirror 100 to the transmission mode. When the image sensor 300 acquires second image data d2 in the transmission mode of the variable mirror 100, the variable mirror controller 110 switches the mode of the variable mirror 100 to the reflection mode. During operation of the camera assembly 20, mode switching of the variable mirror 100 may be repeatedly performed.

When the variable mirror 100 is in the reflection mode, as shown in FIG. 7, the variable mirror 100 reflects (r) light incident in a lateral direction of the image sensor 300 to the image sensor 300. Curvature of the variable mirror 100 may be set to reflect light incident in the lateral direction of the image sensor 300 toward the image sensor 300 by the variable mirror 100.

The image sensor 300 senses light RL reflected by the variable mirror 100 to generate first image data d1. The first image data d1 generated by the image sensor 300 is output to the image processing unit 400. The image processing unit 400 calculates a first image I1 from the first image data d1.

The first image I1 is shown in FIG. 7. The first image I1 is calculated by sensing light incident in the lateral direction of the image sensor 300. Consequently, the first image I1 is an image in the lateral direction except the central part of the image sensor 300.

When the image sensor 300 outputs the first image data d1 to the image processing unit 400, the variable mirror controller 110 switches the mode of the variable mirror 100 from the reflection mode to the transmission mode.

FIG. 8 shows a process of acquiring a second image I2 after the mode of the variable mirror 100 has been switched to the transmission mode. When the variable mirror 100 is in the transmission mode, light incident in a front direction, i.e. a z-axis direction, of the image sensor 300 is transmitted (p) through the variable mirror 100 and is condensed upon the image sensor 300.

The image sensor 300 senses light PL transmitted (p) through the variable mirror 100 to generate second image data d2. The second image data d2 generated by the image sensor 300 is output to the image processing unit 400. The image processing unit 400 calculates a second image I2 from the second image data d2.

The second image I2 is shown in FIG. 8. The second image I2 is calculated by sensing light incident in the front direction of the image sensor 300. Consequently, the second image I2 is an image taken in the front direction of the image sensor 300.

As shown in FIG. 4, the image processing unit 400 receives the first image data d1 and the second image data d2 from the image sensor 300, calculates the first image I1 and the second image I2, and registers the first image I1 and the second image I2 to calculate a third image I3.

The first image I1 includes information regarding the lateral direction of the image sensor 300 but does not include information regarding the front direction of the image sensor 300. On the other hand, the second image I2 includes information regarding the front direction of the image sensor 300 but does not include information regarding the lateral direction of the image sensor 300. The image processing unit 400 registers the first image I1 and the second image I2 to calculate the third image I3 including both information regarding the front direction of the image sensor 300 as well as information regarding the lateral direction of the image sensor 300.

In this embodiment, the camera assembly 20 has a wider viewing angle than a conventional wide-angle lens or a fisheye lens. Consequently, the image acquired by the camera assembly 20 according to this embodiment may include much more information than a conventionally obtained image.

FIG. 9 is a flowchart showing an image acquisition method using the camera assembly 20.

Referring to FIG. 9, light reflected by the variable mirror 100 is sensed to acquire a first image I1 (500).

The variable mirror controller 110 of the camera assembly 20 switches the mode of the variable mirror 100 to the reflection mode. When the mode of the variable mirror 100 is switched to the reflection mode, the image sensor 300 senses light directly incident upon the variable mirror 100 and reflected by the variable mirror 100. In a case in which the camera assembly 20 includes the reflection unit 200, the image sensor 300 senses light incident upon the reflection unit 200 and reflected by the reflection unit 200 toward the variable mirror 100 and re-reflected by the variable mirror 100.

The image sensor 300 senses the light reflected by the variable mirror 100 to calculate first image data d1. The calculated first image data d1 are output to the image processing unit 400. The image processing unit 400 acquires a first image I1 including information regarding the lateral direction of the image sensor 300 from the first image data d1.

When the first image I1 is acquired, the variable mirror controller 110 switches the mode of the variable mirror 100 to the reflection mode (510). The variable mirror controller 110 applies a predetermined magnitude of power to the variable mirror 100 to switch the mode of the variable mirror 100 from the reflection mode to the transmission mode or from the transmission mode to the reflection mode.

Light transmitted through the variable mirror 100 is sensed to acquire a second image I2 (520).

When the mode of the variable mirror 100 is switched to the transmission mode, the image sensor 300 senses light incident upon the variable mirror 100 and transmitted through the variable mirror 100.

The image sensor 300 senses the light transmitted through the variable mirror 100 to calculate second image data d2. The calculated second image data d2 are output to the image processing unit 400. The image processing unit 400 acquires a second image I2 including information regarding the front direction of the image sensor 300 from the second image data d2.

The image processing unit 400 registers the first image I1 and the second image I2 to acquire a third image I3 (530).

The image processing unit 400 may register the first image I1 and the second image I2 to acquire the third image I3 or may combine the first image data d1 and the second image data d2 to acquire the third image I3.

The first image I1 includes information regarding the lateral direction of the image sensor 300 but does not include information regarding the front direction of the image sensor 300. On the other hand, the second image I2 includes information regarding the front direction of the image sensor 300 but does not include information regarding the lateral direction of the image sensor 300. The image processing unit 400 registers the first image I1 and the second image I2 to calculate the third image I3 including information regarding both the front direction of the image sensor 300 as well as information regarding the lateral direction of the image sensor 300.

The methods according to one or more embodiments of the present disclosure may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. Any of the described hardware devices may be configured to act as one or more software modules in order to perform the operations of the above-described embodiments of the present disclosure. Any one or more of the software modules/units described herein may be executed by a general-purpose or special purpose computer, such as, a processor, a controller an arithmetic logic unit, a digital signal processor, a microcomputer, a field programmable array, a programmable logic unit, a microprocessor or any other device capable of responding to and executing instructions in a defined manner. The software modules/units may include a dedicated processor unique to that unit or a processor common to one or more of the modules.

As is apparent from the above description, an image having a wide viewing angle is acquired using a single camera in accordance of an aspect of the present disclosure.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A camera assembly comprising:
   a variable mirror;
   a variable mirror controller to switch a mode of the variable mirror to one of a reflection mode to reflect light incident upon the variable mirror and a transmission mode to transmit light incident upon the variable mirror;
   an image sensor to acquire first image data by sensing the light reflected by the variable mirror and to acquire second image data by sensing the light transmitted through the variable mirror; and
   an image processing unit to combine the first image data and the second image data acquired by the image sensor to generate a third image.

2. The camera assembly according to claim 1, wherein the variable mirror is convex or concave toward the image sensor.

3. The camera assembly according to claim 1, wherein
   the variable mirror is configured such that a surface of the variable mirror opposite the image sensor is concave, and the camera assembly further comprises a reflection unit to reflect incident light to the concave surface of the variable mirror.

4. The camera assembly according to claim 3, wherein the reflection unit is configured such that a surface of the reflection unit opposite the concave surface of the variable mirror is convex and has an opening formed at a region corresponding to the image sensor.

5. The camera assembly according to claim 3, wherein
the image sensor senses light reflected by the reflection unit and re-reflected by the variable mirror to acquire the first image data, and
the image processing unit generates a first image from the first image data.

6. The camera assembly according to claim 5, wherein the first image comprises an image of a lateral direction excluding a central portion of the image sensor and
wherein the image processing unit further generates a second image from the second image data and the second image data comprises an image of the central portion of the image sensor.

7. The camera assembly according to claim 1, wherein the variable mirror controller applies power to the variable mirror to switch the mode of the variable mirror.

8. The camera assembly according to claim 1, wherein the variable mirror is positioned in front of the image sensor.

9. The camera assembly according to claim 1, wherein the first image data does not include image data in a central portion of the image sensor and the second image data includes image data in the central portion of the image sensor.

10. An apparatus comprising:
a camera assembly comprising:
a variable mirror;
a variable mirror controller to switch a mode of the variable mirror to one of a reflection mode to reflect light incident upon the variable mirror and a transmission mode to transmit light incident upon the variable mirror;
an image sensor to acquire first image data by sensing the light reflected by the variable mirror and to acquire first image data by sensing the light transmitted through the variable mirror; and
an image processing unit to combine the first image data and the second image data acquired by the image sensor to generate a third image; and
a display unit to display the third image generated by the camera assembly.

11. The apparatus according to claim 10, wherein the variable mirror is positioned in front of the image sensor.

12. The apparatus according to claim 10, wherein the first image data does not include image data in a central portion of the image sensor and the second image data includes image data in the central portion of the image sensor.

13. An image acquisition method using a camera assembly comprising:
acquiring a first image by sensing light reflected by a variable mirror of the camera assembly;
switching a mode of the variable mirror to a transmission mode;
acquiring a second image by sensing light transmitted through the variable mirror; and
combining the first image and the second image to acquire a third image.

14. The image acquisition method according to claim 13, wherein the sensing of the light reflected by the variable mirror of the camera assembly comprises:
switching, by a variable mirror controller of the camera assembly, the mode of the variable mirror to a reflection mode;
sensing, by an image sensor of the camera assembly, light reflected by the variable mirror to calculate first image data; and
acquiring, by an image processing unit of the camera assembly, a first image from the first image data calculated by the image sensor.

15. The image acquisition method according to claim 14, wherein the sensing of the light reflected by the variable mirror to acquire the first image data comprises the image sensor sensing light reflected by a reflection unit of the camera assembly toward the variable mirror and re-reflected by the variable mirror to calculate first image data.

16. The image acquisition method according to claim 13, wherein the switching of the mode of the variable mirror to the transmission mode comprises a variable mirror controller of the camera assembly applying a predetermined magnitude of power to the variable mirror to switch the mode of the variable mirror from a reflection mode to a transmission mode.

17. The image acquisition method according to claim 13, wherein the sensing of the light transmitted through the variable mirror to acquire the second image comprises:
sensing, by an image sensor of the camera assembly, light incident upon the variable mirror and transmitted through the variable mirror to calculate second image data; and
acquiring, by an image processing unit of the camera assembly, a second image from the second image data calculated by the image sensor.

18. The image acquisition method according to claim 13 comprising:
generating a first image from the first image data wherein the first image comprises an image of a lateral direction excluding a central portion of the image sensor; and
generating a second image from the second image data wherein the second image data comprises an image of the central portion of the image sensor.

19. A non-transitory medium comprising computer readable code to control at least one processor to implement the image acquisition method of claim 13.

20. The image acquisition method according to claim 13, wherein the first image data does not include image data in a central portion of the image sensor and the second image data includes image data in the central portion of the image sensor.

* * * * *